(12) United States Patent
Morrone

(10) Patent No.: US 9,534,404 B2
(45) Date of Patent: Jan. 3, 2017

(54) TAPERING ASSEMBLY

(71) Applicant: Carmelo Morrone, Bethpage, NY (US)

(72) Inventor: Carmelo Morrone, Bethpage, NY (US)

( * ) Notice: Subject to any disclaimer, the term of this patent is extended or adjusted under 35 U.S.C. 154(b) by 457 days.

(21) Appl. No.: 14/133,573

(22) Filed: Dec. 18, 2013

(65) Prior Publication Data

US 2015/0167312 A1 Jun. 18, 2015

(51) Int. Cl.
| | |
|---|---|
| *B28B 11/10* | (2006.01) |
| *E04F 21/165* | (2006.01) |
| *B28B 11/08* | (2006.01) |
| *B29L 7/00* | (2006.01) |
| *B29L 31/00* | (2006.01) |
| *B29L 31/10* | (2006.01) |

(52) U.S. Cl.
CPC ......... *E04F 21/165* (2013.01); *B28B 11/0863* (2013.01); *B29L 2007/002* (2013.01); *B29L 2031/001* (2013.01); *B29L 2031/10* (2013.01)

(58) Field of Classification Search
CPC .... B29C 31/004; B29C 31/047; B29C 43/027; B29C 43/08; B28B 11/0863
USPC ........................................ 425/363, 367, 471
See application file for complete search history.

(56) References Cited

U.S. PATENT DOCUMENTS

| | | | | |
|---|---|---|---|---|
| 2,991,824 | A * | 7/1961 | Loechl | B28B 19/0092 425/373 |
| 4,920,651 | A | 5/1990 | Schmidt | |
| 5,198,052 | A * | 3/1993 | Ali | B28B 11/08 156/209 |
| 6,450,232 | B1 * | 9/2002 | Smythe, Jr. | E04F 21/08 156/574 |
| 6,931,814 | B2 | 8/2005 | Henits | |
| 7,223,311 | B2 * | 5/2007 | Conboy | B28B 11/16 425/385 |
| 8,814,555 | B1 * | 8/2014 | Hensley, Sr. | E04F 21/18 425/367 |
| 2004/0081524 | A1 | 4/2004 | Barnett | |

\* cited by examiner

*Primary Examiner* — Joseph S. Del Sole
*Assistant Examiner* — Thukhanh T Nguyen

(57) ABSTRACT

A tapering assembly compresses a butt end of a barrier into a tapered end for enhanced installation. The barrier includes sheet rock panel. A plurality of rollers and at least one taper roller pass through a front end of a plate portion. The barrier passes through a predetermined distance between the taper roller and the plurality of rollers. The taper roller includes a gradient taper. The plurality of rollers guide the barrier against the taper roller. A rear end of the plate portion includes a bearing that enables the taper roller and plurality of rollers to pass through. A taper roller shaft extends from a rear end of the plate portion. A variable speed drill rotates the taper shaft to provide rotation and torque to the taper roller. The barrier butt end is tapered without causing damage to the barrier from the position and precision calibration of the rollers.

19 Claims, 4 Drawing Sheets

TAPERING ASSEMBLY

CROSS-REFERENCE TO RELATED APPLICATIONS

Not applicable.

RELATED CO-PENDING U.S. PATENT APPLICATIONS

Not applicable

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to tapering a barrier. More particularly, the invention relates to tapering a butt end of a sheetrock panel with automated tapered rollers.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that drywall is a panel made of gypsum plaster pressed between two thick sheets of paper. It is used to make interior walls and ceilings. Drywall construction became prevalent as a speedier alternative to traditional lath and plaster. A wallboard panel is made of a paper liner wrapped around an inner core made primarily from gypsum plaster.

It is well known that drywall may become damaged when exposed to water, especially if the drywall remains exposed to the water for an extended period of time. Often, when a room features drywall installed and an unintended introduction of water occurs and the water comes into contact with the drywall at the base of the wall where the drywall touches the ground, wicking will occur at the ends.

Typically, drywall boards have two types of edges to them: the butt end and the tapered end. Unlike the tapered ends, butt ends make poor seams because the joint compound and tape used to conceal the joint often bulge out and ruin the appearance of a perfectly flat wall. Butt ends are best installed in corners or by openings such as around windows and doors, but you can easily taper the edge to make a suitable joint.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a front detailed perspective view of an exemplary tapering assembly, FIG. 1B illustrates a front top view of an exemplary tapering assembly, and FIG. 1C illustrates a rear top view of an exemplary tapering assembly, in accordance with an embodiment of the present invention; FIG. 2A illustrates an exemplary tape roller having a 0.580 inch diameter, and FIG. 2B illustrates an exemplary tape roller having a 0.380 inch diameter, in accordance with an embodiment of the present invention.

Figure 1A:
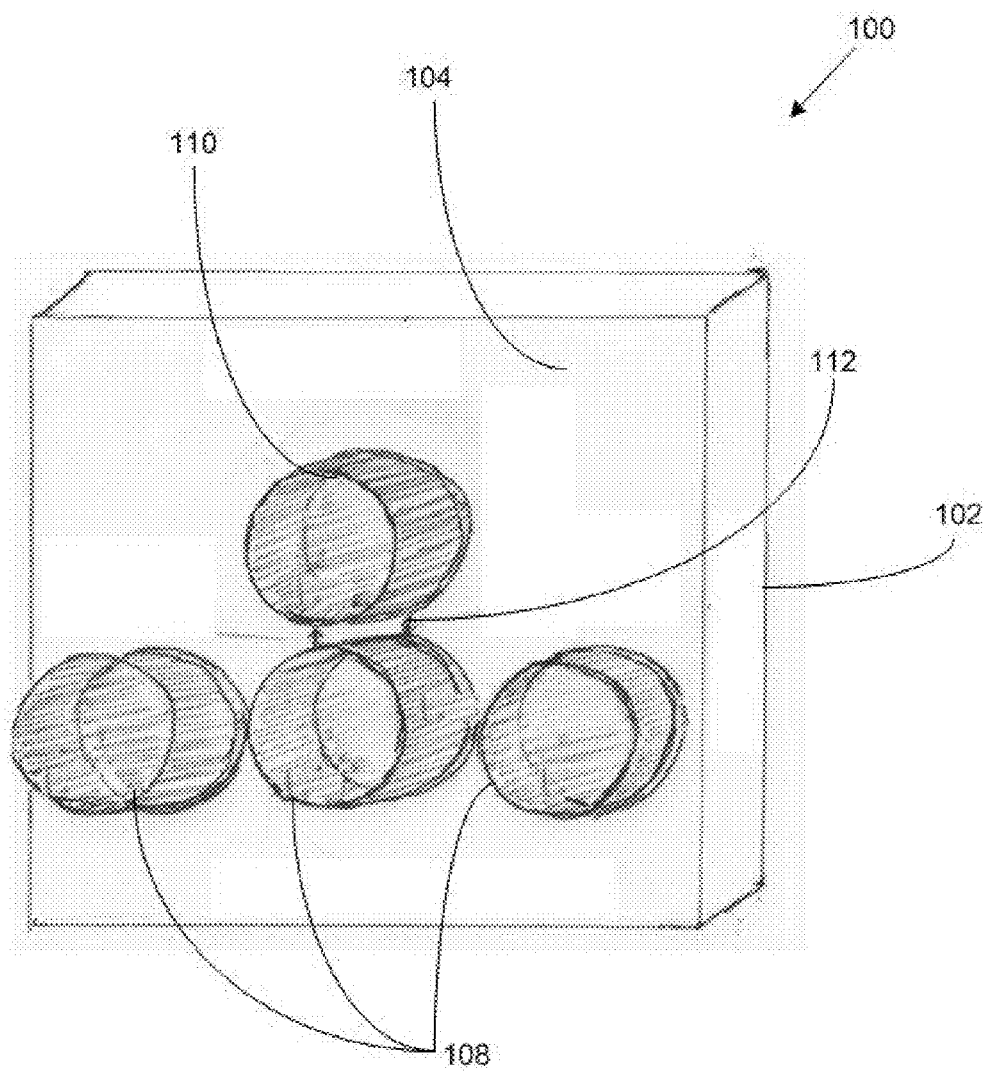
FIGS. 1A, 1B, and 1C illustrate front and rear views of an exemplary tapering assembly, where

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived there from.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of tapering assemblies that may be provided by preferred embodiments of the present invention. In some embodiments, the tapering assembly may at least partially compress a butt end of a barrier into a tapered end for enhanced installation. The barrier may include, without limitation, sheet rock, drywall, plasterboard, wallboard, gypsum board, and foam. In some embodiments, the tapering assembly may include a tool that tapers the butt end of a barrier between a plurality of rollers and an interchangeable taper roller. The barrier butt end may be tapered without causing damage to the barrier due to the position and precision calibration of the rollers. In some embodiments, a variable speed drill rotates a shaft that turns the at least one taper roller through which the barrier butt end passes. Any means used to turn the tapered roller has to be variable speed corded or cordless screw driver or drill. The butt end of the barrier passes between the at least one taper roller and a plurality of rollers to create a tapering effect on the butt end. In some embodiments, the tapering assembly compresses the butt ends of the barrier into a tapered end for enhanced installation. In this manner, the barrier, such as sheet rock, may be spackled, finished where the sheet rock is nailed or screwed, and taped where the sheet rocks meet without bulges or unsightly seams.

In one embodiment of the present invention, the tapering assembly may include a plate portion for containing the various components of the assembly. The plate portion may include a metal plate that is sized and dimensioned to be portable and support rollers, bearings, washers, and barriers. In some embodiments, a variable speed drill may be operatively joined with the plate portion for rotating the various rollers.

In some embodiments, the assembly may include at least one taper roller, which is configured at an angle to create a taper on a barrier by rotating in either a clockwise or counterclockwise rotation. The taper roller is disposed to extend through the front end of the plate portion. The at least one taper roller may taper from a ½" to a 1" diameter. However, in other embodiments, different dimensions may be utilized to create different tapers and engage different types of barriers. A rear side of the taper roller may utilize a taper roller shaft for transmitting torque and rotation to the taper roller. A locking pin and a washer may help fasten the torque roller through the plate portion. Additionally, the at least one taper roller may be interchanged by removing the pin. A front end of the plate portion is where a finished surface of the barrier engages the at least one taper roller. In one embodiment, the at least one taper roller may itself be angled to provide additional tapering effects.

In some embodiments, the assembly may comprise a plurality of rollers that pass from the rear end of the plate portion to the front end of the plate portion. The plurality of rollers may help guide the barrier and also press the barrier against the at least one taper roller. The plurality of rollers may be disposed to position about 0.44" beneath or above the at least one taper roller. The plurality of rollers may include a half inch thick cold rolled steel. In some embodiments, the rear end of the plate portion may secure a ¼" Allen key machine bolts to help rotate each roller. Additionally, a 1.1" bearing may be bored into the rear end of the portion plate to at least partially receive each roller. Each roller may also extend from the front end of the plate portion as a ½" cold pressed steel roller. In some embodiments, the plurality of rollers may position above or below the at least one taper roller, engaging an in finished surface of the barrier. In this configuration, the barrier may pass between the plurality of rollers and the at least one taper roller to compress the butt end, and thereby create a desired taper on the end of the barrier. The angle and precision between the plurality of rollers and the at least one taper roller may help determine the angle and size of the taper on the barrier. In one embodiment, the terminal end of the plurality of rollers and the at least one taper roller may be spaced at 0.444". In some embodiments, the variable drill rotates the at least one taper roller at a desired speed. In one alternative embodiment, the plurality of rollers may be rotated with a motor inside the plate portion.

Figure 1B:
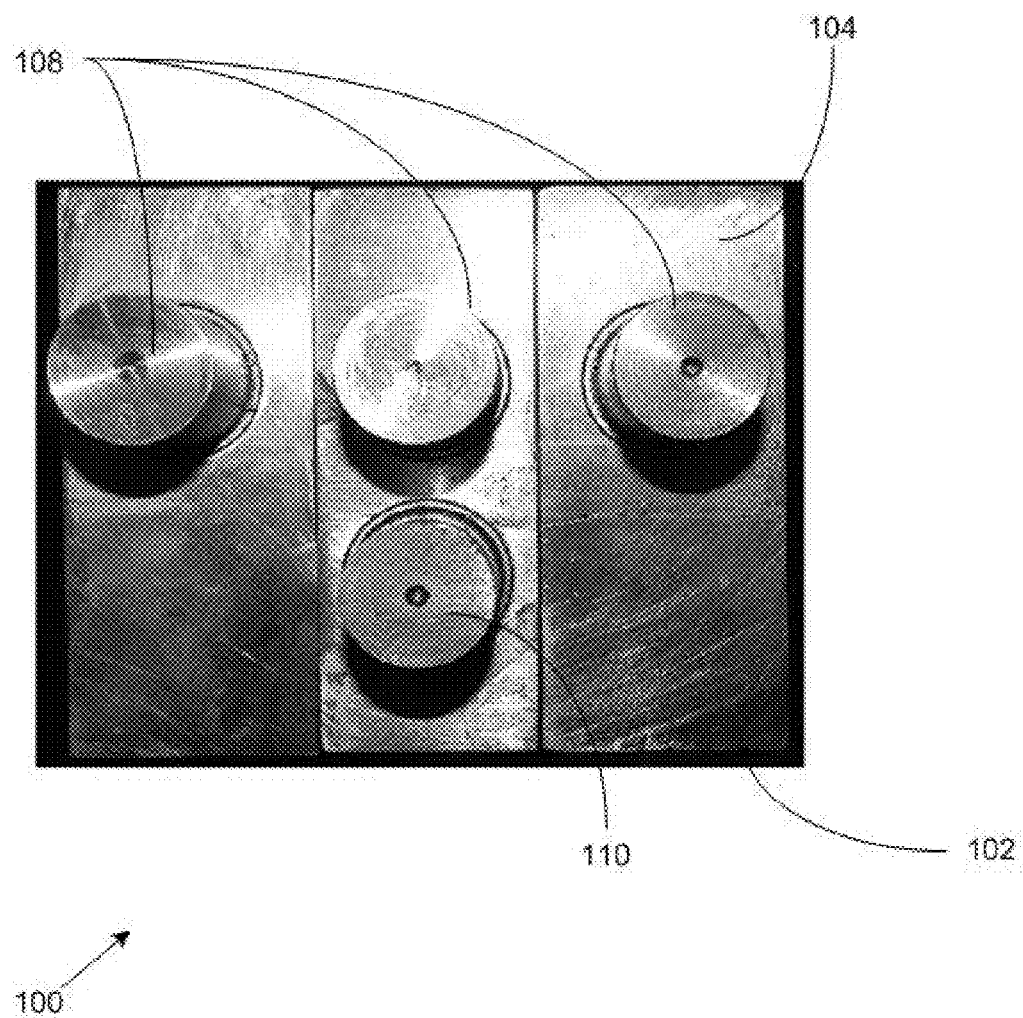
Figure 1C:
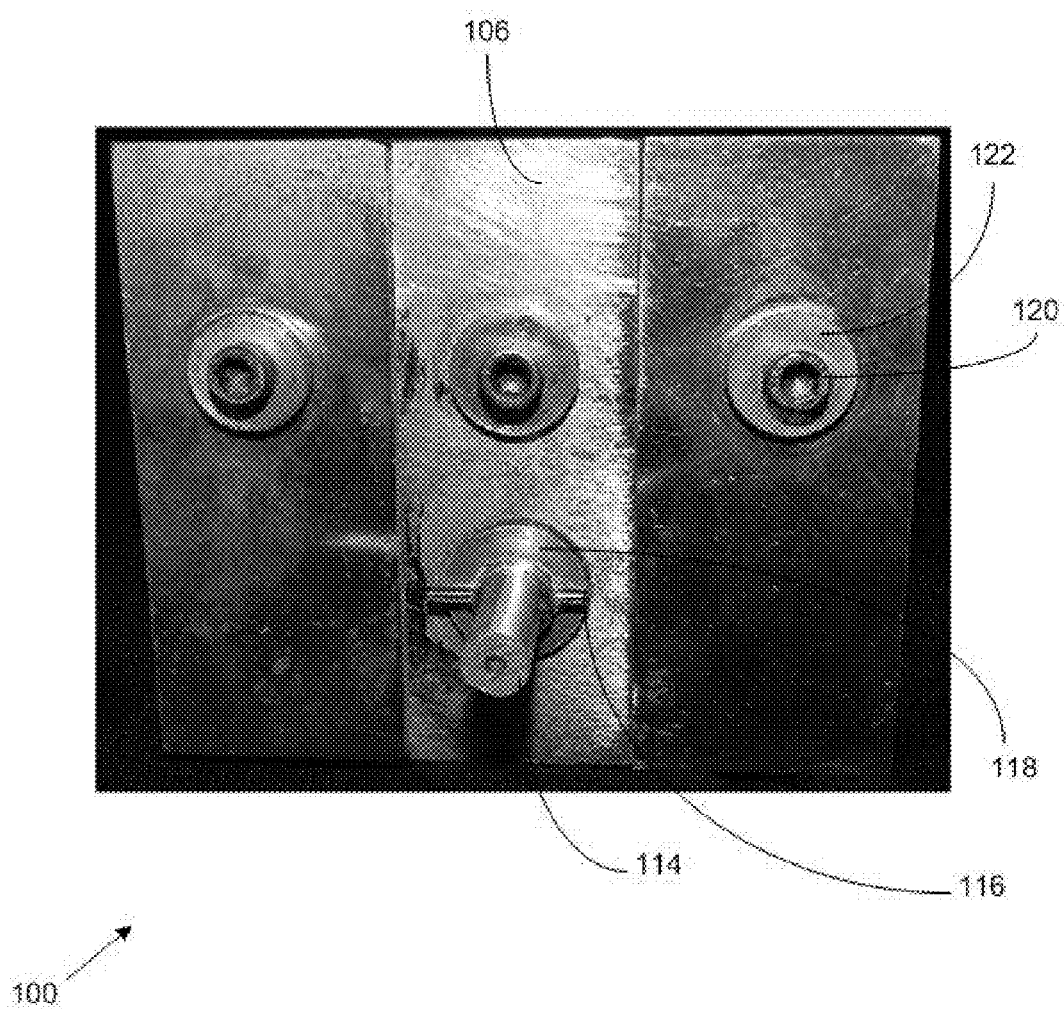

FIGS. 1A, 1B, and 1C illustrate front and rear views of an exemplary tapering assembly, where FIG. 1A illustrates a front detailed perspective view of an exemplary tapering assembly, FIG. 1B illustrates a front top view of an exemplary tapering assembly, and FIG. 1C illustrates a rear top view of an exemplary tapering assembly, in accordance with an embodiment of the present invention. In the present invention, a tapering assembly 100 may at least partially compress a butt end of a barrier into a tapered end for enhanced installation. The barrier may include, without limitation, sheet rock, drywall, plasterboard, wallboard, gypsum board and foam. In some embodiments, the tapering assembly may include a tool that tapers the butt end of a barrier between a plurality of rollers and an interchangeable taper roller. The barrier butt end may be tapered without causing damage to the barrier due to the position and precision calibration of the rollers. The assembly performs this function without damaging the barrier, chiefly due to the precision calibration of the rollers that press down onto the barrier. For example, without limitation, when a nail or screw engages a sheetrock it depresses, because it is designed to depress to accept spackle to fill the void it created. The sheetrock material is made to accept depression, by using the rollers material is stabilized so it can be depressed to accept the final tapered finish. In some embodiments, a variable speed drill rotates a shaft that turns the at least one taper roller. The butt end of the barrier passes between the at least one taper roller and a plurality of rollers to create a tapering effect on the butt end.

In some embodiments, the tapering assembly compresses the butt ends of the barrier into a tapered end for enhanced installation. In this manner, the barrier, such as sheet rock, may be spackled, finished where the sheet rock is nailed or screwed, and taped where the sheet rocks meet without bulges or unsightly seams. Those skilled in the art, in light of the present teachings, will recognize that drywall boards may include two types of edges: the butt end and the tapered end. Unlike the tapered ends, butt ends make poor seams when joined together because the joint compound and tape used to conceal the joint between two butt ends often bulges out and degrades the appearance of a perfectly flat wall. The present invention may be efficacious for tapering the butt ends to help form a suitable joint between two sheet rocks. Additionally, the tapering assembly is portable, and comprises sufficient interchangeability with the components such that various tapering angles and types of barrier materials may be tapered accordingly.

In one embodiment of the present invention, the tapering assembly may include a plate portion 102 for containing the various components of the assembly. The plate portion may include a front end 104 from where the rollers extend for engaging the barrier. The plate portion may further include a rear end 106 from where a shaft may extend and join with a drill for powering the rollers. In some embodiments, the plate portion may include a metal plate that is sized and dimensioned to be portable and support rollers, shafts, bearings, washers, and barriers. The rollers, shafts, bearings, washers, and barriers may be machined into the plate portion. In some embodiments, a variable speed drill may be operatively joined with the plate portion for rotating the various rollers. In one embodiment, the plate portion may be dimensioned at 4¾" length, ½" width, and 4" height. These dimensions may enable facilitated portability for carrying to constructions sites for example. Suitable materials for the plate portion may include, without limitation, steel, iron, metal alloy, wood, and a rigid polymer.

In some embodiments, the assembly may include at least one taper roller 110, which is configured at an angle gradient to create a taper on the barrier by rotating in either a clockwise or counterclockwise rotation. The taper roller is disposed to extend from the rear end through the front end of the plate portion. The at least one taper roller may taper from a ½" to a 1" diameter. However, in other embodiments, different dimensions may be utilized to create different tapers and engage different types of barriers. A rear side of the taper roller may utilize a taper roller shaft 114 for transmitting torque and rotation to the taper roller. The taper roller shaft may include a dimension of 1" length and ⅜" diameter. You can make bigger or smaller taper roller for accepting spacing say for 2" foam material. Just one of the many examples, you will have to make the tool larger in sizing the base to accepting the bigger spacing needed for bigger thickness material. However, in other embodiments, larger or smaller shafts may be utilized to help rotate the at least one taper roller. A locking pin 116 and a washer 118 may help fasten the at least one taper roller through the plate portion. The washer may include, without limitation, a 0.888" washer. Additionally, the taper roller may be interchanged by removing the pin. A front end of the plate portion is where the barrier engages a finished surface of the at least one taper roller. In one embodiment, the at least one taper roller may itself be angled to provide additional tapering effects.

In some embodiments, the assembly may comprise a plurality of rollers 108 disposed to position about 0.444" beneath or above the at least one taper roller. The plurality of rollers may position above or below the at least one taper roller for engaging an unfinished surface of the barrier. The plurality of rollers may help guide the barrier and also press the barrier against the at least one taper roller. In some embodiments, the plurality of rollers may include between 2-4 rollers. However, in one embodiment, 3 rollers may be efficient for inhibiting damage to the barrier. In some embodiments, the rear end of the plate portion may secure a ¼" allen key machine bolt 120 to help rotate each rollers. Additionally, a 1.1" bearing 122 may be bored into the rear end of the portion plate to at least partially receive each roller. Each roller may also extend from the front end of the plate portion as a ½" cold pressed steel roller. In this configuration, the barrier may pass between the plurality of rollers and the at least one taper roller to compress the butt end, and thereby create a desired taper on the end of the barrier. The angle and precision between the plurality of rollers and the at least one taper roller may help determine the angle and size of the taper on the barrier. The plurality of rollers may include, without limitation, cold rolled steel. Cold rolled steel is stable and will not change its density.

In one embodiment, the terminal end of the plurality of rollers and the at least one taper roller may be spaced at a predetermined distance 112 for creating the desired taper. In one embodiment, the predetermined distance may include a 0.444" space. However, in other embodiments, the predetermined distance may be a gradient having a distance at a plate end, in proximity to the plate portion, while a terminal end may be spaced at a greater or lesser distance, depending on tapering needs. In this manner, as the barrier passes through, the barrier end that is closer to the plate portion may be compressed more than the exterior end of the barrier; thereby forming a taper. In some embodiments, the variable drill rotates the at least one taper roller at a desired speed. In one alternative embodiment, the plurality of rollers may be rotated with a motor inside the plate portion.

In operation, the assembly may be installed and operatively joined with various types and speeds of drills from the tape roller shaft at the rear end of the portion plate. The drill may have variable speeds. The barrier is placed in a cross sectional orientation between the plurality of rollers and the at least one taper roller. The assembly abuts against a starting end of the barrier for tapering. The rotational direction of the rollers may be clockwise or counter clockwise depending on the starting direction. For example, without limitation, a counter clockwise rotation may be used if a user starts the barrier from the right side, moving to the left. The rotational speed of the rollers may include 250-500 rotations per minute, while keeping the assembly against the barrier end. The barrier may be pushed to the end and may also be pushed through from right to left at a counterclockwise rotation of the rollers. In some embodiments, the taper of the butt end may be completed after only one run, and in less than a minute for standard size 4'×8' sheet rock.

Figures 2A, 2B:
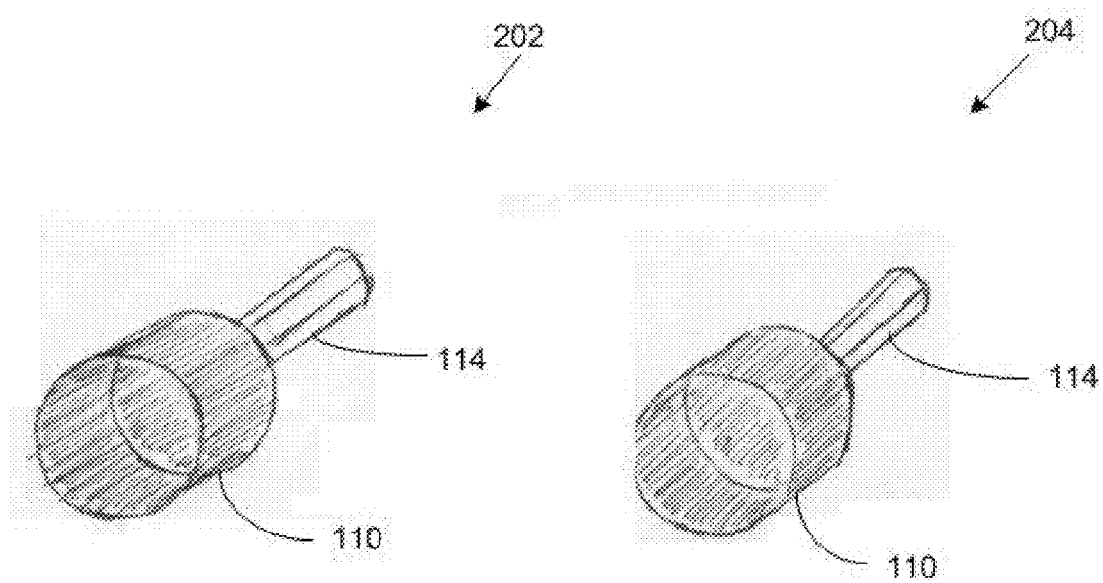
FIGS. 2A and 2B illustrate detailed perspective views of an exemplary taper roller, where

FIGS. 2A and 2B illustrate detailed perspective views of an exemplary taper roller, where FIG. 2A illustrates an exemplary tape roller having a 0.580 inch diameter, and FIG. 2B illustrates an exemplary tape roller having a 0.380 inch diameter, in accordance with an embodiment of the present invention. In the present invention, additional sizes and dimension of the at least one tape roller may be interchanged by removing the fasteners and washers from the rear end of the plate portion and passing the taper roller shaft through. For example, without limitation, a 0.580" diameter sheet rock roller 202 may be tapered with the at least one taper roller, and a 0.380" sheet rock roller 204 may also be tapered in the same assembly by interchanging only the at least one taper roller and leaving the other components alone.

In one alternative embodiment, the at least one roller and/or the plurality of rollers tilt slightly to create a tapering effect. In yet another alternative embodiment, the assembly comprises illumination to help guide the barrier through the rollers. In another alternative embodiment, the plate portion contains a motor to rotate the plurality of rollers and/or the at least one taper roller. In yet another alternative embodiment, the at least one taper roller can be positioned above or beneath the plurality of rollers.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allow ability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a tapering roller for barrier butt ends that doesn't cause damage to sheet rock according to the present invention will be apparent to those skilled in the art. Various aspects of the invention have been described above by way of illustration, and the specific embodiments disclosed are not intended to limit the invention to the particular forms disclosed. The particular implementation of the tapering roller for barrier butt ends that doesn't cause damage to sheetrock may vary depending upon the particular context or application. By way of example, and not limitation, the tapering roller for barrier butt ends that doesn't cause damage to sheet rock described in the foregoing were principally directed to a taper roller and a plurality of rollers that enable a sheet rock butt end to pass through for tapering implementations; however, similar techniques may instead be applied to tapering various materials, including fabrics, polymers, and fiberglass, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An assembly comprising:
    at least one taper roller, said at least one taper roller being configured to at least partially taper a butt end of a barrier into a substantially tapered end, said at least one taper roller comprising a gradient angle, said at least one taper roller comprising a taper roller shaft, said taper roller shaft being configured to transmit a torque and a rotation to said at least one taper roller;
    a plurality of rollers, said plurality of rollers being disposed to position at a predetermined distance from said at least one taper roller, said plurality of rollers being configured to guide said barrier through said predetermined distance, said plurality of rollers further being configured to press said barrier against said at least one taper roller; and a plate portion, said plate portion being configured to at least partially receive said at least one taper roller and said plurality of rollers, said plate portion comprising a front end, said plate portion further comprising a rear end, said rear end comprising a bolt, said bolt being configured to help rotate said at least one taper roller and said plurality of rollers.

2. The assembly of claim 1, in which said barrier comprises a 4'×8' drywall panel.

3. The assembly of claim 2, in which said at least one taper roller comprises a cylindrical rod.

4. The assembly of claim 3, in which said at least one taper roller comprises a shaft having the length of 1".

5. The assembly of claim 4, in which said at least one taper roller comprises a tapered diameter tapering from about ½ inch to about 1 inch.

6. The assembly of claim 5, wherein a locking pin and a washer help fasten said at least one taper roller through said plate portion.

7. The assembly of claim 6, in which said washer comprises a diameter of 0.750".

8. The assembly of claim 7, wherein a rotating device is operable to help rotate said taper roller shaft.

9. The assembly of claim 8, in which said rotating device comprises a variable speed drill.

10. The assembly of claim 9, in which said at least one taper roller and said plurality of rollers rotate at about 250 to about 500 rotations per minute.

11. The assembly of claim 10, in which said plurality of rollers comprises 3 cylindrical rods.

12. The assembly of claim 11, in which said predetermined distance comprises about a 0.444" space.

13. The assembly of claim 12, in which said bolt comprises a ¼" hex key.

14. The assembly of claim 13, in which said plate portion comprises a steel cold pressed plate.

15. The assembly of claim 14, in which said plate portion comprises a dimension of 4" height, 4¾" length, and ½" width.

16. The assembly of claim 15, in which said rear end comprises a bearing.

17. The assembly of claim 16, wherein said bearing is configured to at least partially receive said at least one taper roller and said plurality of rollers.

18. The assembly of claim 17, in which said assembly comprises a cold rolled steel material.

19. An assembly consisting of:

at least one taper roller, said at least one taper roller comprising a 1" long cylindrical rod, said at least one taper roller being configured to at least partially taper a butt end of a barrier into a substantially tapered end, said at least one taper roller comprising a gradient angle, said gradient angle being configured to taper from about 1" to about ½", said at least one taper roller comprising a taper roller shaft, said taper roller shaft being configured to transmit a torque and a rotation to said at least one taper roller, said taper roller shaft being configured to enable a rotating device to rotate said at least one taper roller;

a plurality of rollers, said plurality of rollers comprising 3 cylindrical rods, said plurality of rollers being disposed to position at a predetermined distance from said at least one taper roller, said predetermined distance comprising about 0.444", said plurality of rollers being configured to guide said barrier through said predetermined distance, said plurality of rollers further being configured to press said barrier against said at least one taper roller; and a plate portion, said plate portion being configured to at least partially receive said at least one taper roller and said plurality of rollers, said plate portion comprising a cold pressed steel material, said plate portion comprising a dimension of 4" height, and 4¾" length, and ½" width, said plate portion comprising a front end, said plate portion further comprising a rear end, said rear end comprising a bolt, said bolt being configured to help rotate said at least one taper roller and said plurality of rollers, said bolt comprising a ¼" hex key, said rear end further comprising a bearing, said bearing being configured to at least partially receive said at least one taper roller and said plurality of rollers, said rear end further comprising a locking pin and a washer for at least partially fastening said at least one taper roller through said plate portion.

\* \* \* \* \*